April 12, 1955 — T. W. BLASER — 2,706,238
ELECTRICALLY HEATED KNIFE
Filed Jan. 31, 1952
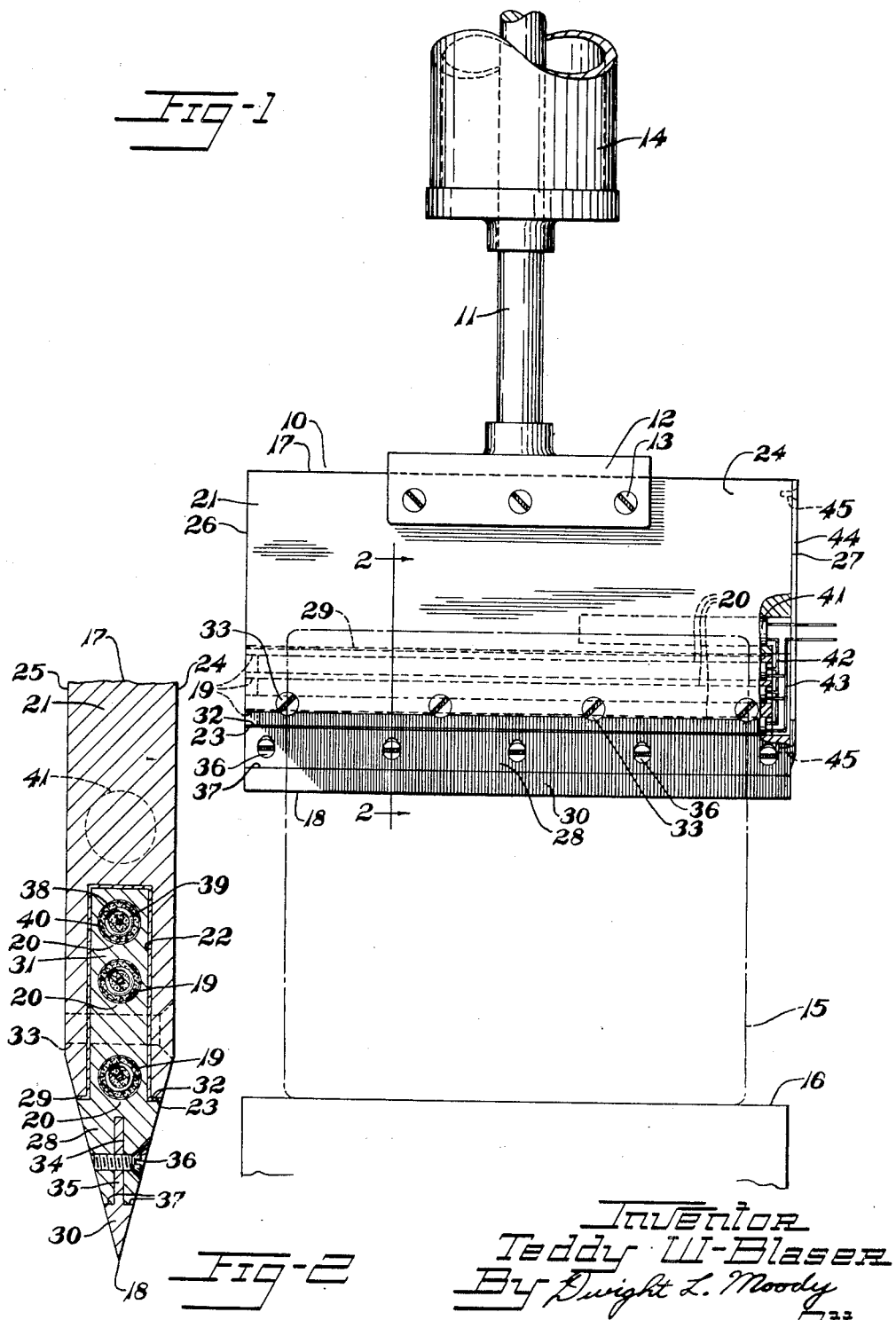
Inventor
Teddy W. Blaser
By Dwight L. Moody
Atty

United States Patent Office 2,706,238
Patented Apr. 12, 1955

2,706,238

ELECTRICALLY HEATED KNIFE

Teddy W. Blaser, Cuyahoga Falls, Ohio, assignor to The B. F. Goodrich Company, New York, N. Y., a corporation of New York Application January 31, 1952, Serial No. 269,291

9 Claims. (Cl. 219—21)

The invention relates to cutting-tools of the heated type and especially to cutting-tools of the electrically heated type useful for severing solid material such, for example, as natural or synthetic rubber, or other rubber-like or plastic material.

Heretofore, ordinary steel knives of the unheated type, with or without the aid of a lubricant such as water, have been used to cut yieldable rubber in the unvulcanized or vulcanized condition by manual or machine operations. This has required frequent sharpening and replacement of the knives, and has been objectionably slow and difficult when cutting relatively large masses of solid yieldable rubber such, for example, as bales of crude rubber, and in addition great force has been necessary heretofore to compel movement of the knife through the bale to sever the rubber into chunks.

Electrically heated knives with the heating current passing directly through the resistance metal material of the knife especially at its cutting-edge have not been wholly satisfactory for the purpose because of the difficulty in preventing electrical shortening when the edge accidentally contacts water or foreign conductive metal material while cutting the bale of crude rubber, for example, and in preventing charring or burning of the rubber at the adjacent faces of adjacent severed chunks.

Also, difficulty has been experienced with the prior knives in providing smooth cut edges or surfaces of the rubber material which are desirable in some applications of the rubber material.

An object of the invention is to provide for overcoming the foregoing and other disadvantages of the prior knives.

Other objects of the invention are to provide an improved knife assembly of the heated type, especially electrically heated type, suitable for manual or machine operation; to provide for electrically heating the knife-edge without conducting heating current through the material of the knife; to provide for avoiding electrical short-circuits of the knife; to provide for maintaining high heat at the knife-edge and for avoiding overheating of the knife; to provide for maintaining sharpness of the knife-edge; to provide for relatively high heat-conductivity of the knife-edge as compared to that of an adjacent portion of the knife; to provide for heat-insulating the knife structure at the region of the knife-edge from the adjacent structure of the knife; to provide for the insertion, removal and replacement of the heating means of the knife; to provide for one or more independent electrical heating units or structures in the knife adjacent and along the knife-edge and for an electrically insulated mounting of heating elements in such units relative to the knife structure; to provide for heat conduction to the knife-edge with low heat-loss; to provide for replacement of the knife-edge; and to provide for simplicity of construction, convenience of manufacture and for effectiveness of operation.

These and other objects and advantages of the invention will be apparent from the following description.

In the accompanying drawings which form a part of this specification and in which like numerals are employed to designate like parts throughout the same, Fig. 1 is a front elevational view of an electrically heated cutting-tool or knife assembly associated with operating mechanism therefor and constructed in accordance with and embodying the invention, parts being broken away and in section, and Fig. 2 is a sectional view taken along line 2—2 of Fig. 1 showing the mounting of the heating elements and cutting-element of the knife assembly.

In the illustrative embodiment of the invention shown in the drawings the construction has a cutting-tool or knife assembly 10 of the heated type mounted vertically at the lower end of a suitable movable piston rod 11 as by a suitable channeled mounting fixture 12 and screw fastener means 13, 13, which piston rod 11 is mounted axially slidable in and projects through the lower end of a cylinder housing 14 of suitable reciprocating piston power means (not shown) of the hydraulic, or air, or steam-driven type. The knife assembly 10 is compelled to reciprocate vertically by the power-actuated reciprocating movement of the piston rod 11 so that the knife assembly in its heated condition is adapted to sever quickly a relatively large mass of solid material such, for example, as a bale 15 of crude, unvulcanized and yieldable, natural or synthetic rubber or other rubber-like or plastic material into chunks, while the bale 15 is supported on a horizontal supporting surface or platform 16.

The knife assembly 10 includes a knife-blade 17 comprising a body 21 of stiff strong material capable of resisting objectionable distortion, when in a heated condition for cutting purposes, which material is preferably a strong metal such, for example, as a steel alloy, and the like having good heat-conducting characteristics. The body 21 of the knife-blade 17 has provision for retaining a mounting element 28 which has one or more passages 19, 19 therein to accommodate heating means 20, 20.

Desirably, the knife-blade 17 has an elongate composite construction as shown in the drawings, although not necessarily limited thereto, which construction includes a body or supporting portion 21 of steel alloy relatively thick and of flat sheet-like form to provide good strength and high resistance to distortion in the heated condition of the knife assembly and to facilitate the attachment of the knife-blade 17 at its upper region to the piston rod 11 in axial alignment therewith.

The body 21 has a slot 22 of substantial, uniform depth and generally rectangular shape in cross-section in its lower side face 23 and intermediate its substantially parallel, flat front 24 and back 25 faces, which slot 22 may be open at both ends thereof and desirably extends from end face 26 to end face 27 of the portion 21. The opposite walls in the slot 22 corresponding to the front 24 and back 25 faces of the portion 21 may diverge at an angle of about 2° in the direction toward the side face 23 to facilitate the insertion and removal of a mounting element 28. The side face 23 and all the interior walls in the slot 22 have a thin continuous covering 29 of heat-insulating material such, for example, as sheet asbestos of suitable thickness adapted to function effectively as a barrier to the passage of heat from the mounting element 28 to the steel body 21 to avoid objectionable heat loss to the body 21.

The mounting element 28 is preferably made of aluminum alloy having a thermal conductivity about five times that of the steel alloy of the body 21, that is a heat conductivity of the aluminum relative to that of the steel in the ratio of about 5 to 1, for facilitating the rapid transmission of heat toward and to the knife-edge 18. The mounting element 28 may have a length substantially equal to that of the body 21 so as to be heat insulated from and backingly and uniformly supported by such body 21 along the entire length of the element 28.

An important feature of the invention is that the mounting element 28 functions to hold and support the heating means 20, 20 and to detachably hold and backingly support a cutting element 30 presenting the knife-edge 18. To this end the mounting element 28 has a locking portion 31 of reduced thickness and generally rectangular shape in cross-section disposed in the slot 22 in snug fitting, slidably detachable relation to the insulation-covered walls therein, and by virtue of the reduction in thickness, has shoulders 32, 32 seated against the insulated side face 23 of the body 21, all of which resists wobble or looseness of the element 28 relative to the body 21. The locking portion 31 has preferably a plurality of the passages 19, 19 of suitable shape in cross-section such, for example, as circular and uniform diameter extending longitudinally therein from end to end of the portion 31 in laterally spaced-apart substantially parallel relation one to the other and to the knife-edge 18 for accommodating the heating means 20, 20 which may be permanently and fixedly mounted in the mounting element or may be detachably mounted in such element 28. The spacing between a pair of adjacent passages is sufficient to accommodate longitudinally spaced-apart screw fasteners 33, 33 of brass, for example, extending between the pair of passages and laterally through the locking portion 31 in threaded engagement with the body 21 of the knife-blade 17 and with the locking portion 31, so as to lock the same detachably and securely together, the body 21 being countersunk at its front face 24 to receive and conceal the heads of the screw fasteners 33, 33.

The mounting element 28 at its lower side face opposite the locking portion 31 is provided with a relatively narrow groove 34 of substantial depth and generally rectangular shape in cross-section extending rearwardly inward from such side face of the element 28 and coextensive therewith for receiving snugly and detachably an extension 35 of the cutting element 30 so that all the walls in the groove 34 are in contacting direct heat-transmitting relation to all the walls of the extension 35. The mounting element 28 and the cutting element 30 are detachably yet securely clamped and held together by longitudinally spaced-apart screw fasteners 36, 36 extending laterally through such element 28 and the extension 35 in threaded engagement therewith, the mounting element 28 being countersunk at its front face to receive and conceal the heads of the screw fasteners 36, 36.

The mounting element 28 by virtue of its heat-insulated mounting in the body 21 and by virtue of its particular material and relatively large mass compared to that of the cutting element 30, provides in effect a fly-wheel type of heat-storing action to further facilitate maintaining a desired high temperature at and along the knife-edge 18.

The cutting element 30 including its extension 35 is preferably coextensive with the mounting element 28 and may be made of copper alloy having a thermal conductivity about nine times that of the steel alloy of the body 21, or about two times that of the aluminum alloy of the mounting element 28, so that heat from the heating means 20, 20 is transmitted through the aluminum and copper materials of the element 28 and 30 with minimum heat-loss to the steel body so as to effect continuously maximum operating temperature at and along the knife-edge 18 for facilitating effective, quick severance of the rubber of the bale 15 without objectionable charring or burning of the rubber. The cutting element 30 has copper abutments 37, 37 seated directly against the aluminum lower side face of the mounting element 28 in supported heat-transmitting relation thereto, and tapers away from the extension 35 and abutments 37, 37 to the thin, sharp knife-edge 18. The attachment of the cutting element 30 to the mounting element 28 resists effectively wobble and looseness of the connection between the elements 30 and 28 yet permits ready removal and replacement of the cutting element 30.

The lateral extent and steepness of taper of the knife assembly at the region of its knife-edge may be varied to suit the requirements of the particular application of the knife assembly and to suit the particular material to be severed. Good results can be obtained in cutting crude rubber bales when the knife assembly has a gradual taper extending continuously rearwardly from the knife-edge 18 across the mounting element 28 and across a narrow part of the lower region of the body 21 at the opening of the slot 22, as shown especially in Fig. 2. Relatively smooth exterior surfaces of the knife assembly are presented continuously to the adjacent severed rubber material of the bale 15 to facilitate freedom of movement of the knife through the bale.

In the preferred construction the heating means 20, 20 is electrical in character and constructed and arranged in a manner to avoid passing the electrical heating current through the material of the body 21, the mounting element 28 and the cutting element 30, and in a manner to electrically insulate the heating element or resistance wire from the material of the knife. The heating means may be individual self-contained heating units or cartridges of the electrical resistance heating type permanently mounted or detachably mounted in the mounting element 28. For the detachable mounting each unit is adapted to be inserted end first into and removed end first from one of the passages 19, 19 so that each passage contains at least one or more individual heating units, in end-on relation, the number of units disposed in a passage being dependent at least partially on the length of the knife to be heated. For the embodiment shown in the drawings only one electrical heating unit 20 is detachably mounted in each passage and is substantially coextensive therewith, which arrangement facilitates simplified connections of the individual heating units to a suitable source of electrical heating current (not shown), and facilitates replacement of the heating units together with continuity and uniformity of heating along the knife-edge 18.

Each heating unit 20 may be of the same construction and desirably of the same rated electrical wattage and normal operating temperature. A suitable known and commercially available construction of each individual heating unit 20 includes a tubular outer cover 38 of suitable heat-conducting metal closed at both ends and having a suitable outer diameter so as to fit snugly within the passage 19 so that good, direct heat-transmitting contact of the cover 38 against the wall in the passage 19 is provided continuously along and about the heating unit 20. Within the metal cover 38 a helically coiled resistance metal heating element or wire 39 extends centrally along the cover 38 in electrically insulated relation thereto and may have both ends of the wire 39 constituting leads of the heating unit brought out through one terminal end of the cover in electrically insulated relation thereto for connection purposes. A suitable filler 40 of electrical insulating, heat-conducting material such, for example, as ceramic material fills the remainder of the space within the outer cover 38 not occupied by the heating wire 39 and completely surrounds all portions of the wire to hold the same in position and in electrically insulated relation to the cover 38, whereby the heating wire 39 is also electrically insulated from the structure of the knife. Normally the snug fit of the cover 38 in the passage makes feasible holding the heating unit against accidental slippage out of the passage but permits ready removal of the heating unit from the passage, when desired. The arrangement prevents electrical shock to the operator because it provides for electrically grounding the knife assembly to the piston rod 11, for example, in case of electrical failure of the heating unit, since the brass screw fasteners 33, 33 electrically connect the mounting element 38 to the body 21.

When a single heating unit is in each passage, as shown especially in Fig. 1, the plurality of heating units are electrically connected through a suitable thermo-switch 41 to the source of heating current. The thermo-switch 41 prevents overheating of the knife assembly and may be mounted in a suitable aperture in the body 21 at one end 27 thereof adjacent the uppermost heating unit 20, and makes and breaks the circuit through the switch in response to the temperature of the body 21. The leads of the heating units 20, 20 are connected to suitable insulated wires 42, 43 disposed in a suitable shallow groove in the end face 27 of the body 21 and in the mounting element 28, and protected by a thin metal cover plate 44 attached to the end face 27 as by one or more screw fasteners 45. It will be noted that one wire 42 is connected to one electrical side of the thermo-switch 41, the other electrical side of the thermo-switch being connected to the source of heating current, while the other wire 43 is connected to the source of heating current.

In the operation of the apparatus the knife assembly 10 with the knife-edge 18 in heated condition is first disposed in its uppermost position and the bale 15 of crude rubber is placed on the supporting surface 16 underneath the knife assembly. The power-driven piston rod 11 under downward reciprocating movement applies downward force to the knife assembly to compel movement of the knife-blade 17 and heated knife-edge 18 through the bale 15 so as to sever the material into chunks; the upward reciprocating movement of the piston rod 11 returns the knife assembly 10 to its uppermost position.

When heating units of about 1400° F. rated operating temperature are used in the knife assembly, good results may be obtained with the thermo-switch 41 set at a maximum temperature limit of about 1,000° F. to about 1,100° F. to break the electric circuit to the heating units 20. This produces and maintains continuously a substantially uniform operating temperature of about 800° F. at and along the immediate region of the knife-edge 18, while cutting is being done, which high knife-edge operating temperature advantageously makes feasible relatively rapid severance of the rubber of the bale 15 without requiring the application of objectionable force by the piston rod 11 to the knife assembly 10 and without objectionable charring of the rubber of the severed chunks. The severed rubber surfaces of the bale 15 rearward of the heated knife-edge 18 tend to conform to and maintain contact against the cutting element 30, the mounting element 28 and the body 21 of the knife assembly, and thereby pick up some heat from the knife assembly during its downward passage through the bale. The mounting element 28 by virtue of its fly-wheel type of heat-storing action, coacts with the heating units and cutting element to facilitate maintaining the desired temperature of about 800° F. at the knife-edge even though heat is lost by contact of the exterior surfaces of the knife assembly with the adjacent rubber surfaces of the chunks.

The knife assembly 10 described hereinabove has provision for electrically heating the sharp knife-edge 18 to a relatively high temperature without passing the heating current directly through the material of the knife-edge, and provision for replacement of the heating units as individual elements by removing the desired heating unit end first from a passage within the knife-blade and inserting a second heating unit end first into the passage. Also, the mounting element having the heating units therein can be replaced, and the cutting element can be replaced conveniently when desired. The construction eliminates to a large degree any electrical hazard of shorting of the knife, especially at the knife-edge, and of shock to the operator, and is suited for manual operation as well as machine operation.

Variations may be made without departing from the scope of the invention as it is defined in the following claims.

I claim:

1. A knife assembly for severing solid material, said knife assembly comprising a knife-blade of stiff heat-conducting material having a side face and a slot of substantial depth extending inwardly in and along said side face, a thin layer of heat insulating material covering said side face and the wall in said slot, a mounting element of stiff material and relatively greater heat-conductivity than that of said knife-blade extending along said side face and having a locking portion mounted detachably in said slot and a tapered portion forwardly of the slot terminating in a grooved side face, said locking portion having passages therein extending along said knife-blade and said mounting element for receiving and holding electrical heating units therein in heat-conducting relation therewith, and a cutting element of stiff material of relatively greater heat-conductivity than that of said knife-blade and said mouning element extending along the mounting element at said grooved side face with an extension mounted detachably in the groove in contacting heat-conducting relation to the wall in the groove, said cutting element tapering away from said tapered portion of the mounting element and terminating in a thin sharp knife-edge adapted to be heated by heat conducted from the electrical heating container means through the mounting element and the cutting element.

2. A knife assembly for severing solid material, said knife assembly comprising an elongate knife-blade having a side face, a mounting element of heat-conducting material extending along said side face and mounted on said knife-blade in heat-insulated relation therewith and having laterally spaced-apart passages therein, a cutting element of stiff material of relatively greater heat-conductivity than that of said mounting element extending along and mounted detachably on said mounting element in contacting heat-conducting relation therewith and tapering to a thin sharp knife-edge, and electrical heating means including individual electrical resistance heating units detachably mounted in said passages and including thermoswitch means responsive to the temperature of and carried by said knife-blade and electrically connected to said heating units for controlling the maximum operating temperature of the heating units so as to maintain said knife-edge in a heated condition while said solid material is being severed by the knife assembly.

3. A knife assembly as defined in claim 2 in which said knife-blade is of steel alloy metal and has a slot in said side face thereof; said mounting element is of aluminum alloy metal and has a locking portion with said passages therein mounted in said slot in said heat-insulated relation to the wall in said slot and to said side face; said cutting element is of copper alloy metal; and in which said heating units are substantially coextensive relative to one another and to said knife-edge for continuity of heating along the knife-edge.

4. A knife assembly for severing solid material, said knife assembly comprising a supporting body of knife-like formation and stiff material resistant to distortion under heat and having a side margin extending along the body, a cutting element of stiff heat-conductive material extending along said side margin in outwardly spaced relation thereto laterally of the body and presenting a sharp knife-edge remote from said body, and a mounting element of stiff material of lower heat-conductivity than that of said cutting element but higher heat-conductivity than that of said supporting body extending from said side margin of the body to said cutting element, said mounting element being united with and backingly supported by said supporting body and being united with and backingly supporting said cutting element in contacting heat-transmitting relation thereto, and said mounting element having passage means extending therein along both said body and said cutting element in spaced relation thereto for accommodating heating means in said passage means to maintain said knife-edge in a heated condition while solid material is being severed by the knife assembly.

5. A knife assembly for severing solid material, said knife assembly comprising a supporting body of knife-like formation and stiff heat-conducting material having a side face extending along the body and intersecting front and back faces thereof and said body having a slot of substantial depth extending along and laterally inwardly in said side face intermediate said front and back faces to provide front and back shielding wall portions of said body at said slot, a cutting element of stiff material of substantially greater heat-conductivity than that of said body disposed along said side face laterally outward of said slot and presenting a sharp knife-edge remote from said body, a heat-storing mounting element of stiff material of greater heat-conductivity than that of said body but lesser heat-conductivity than that of said cutting element mounted in said slot in snug fitting supported relation to said front and back shielding wall portions and said mounting element having a side face exteriorly of said slot united with said cutting element in supporting contacting heat-transmitting relation thereto, said mounting element having passage means therein extending in and along said slot in spaced relation to said front and back shielding wall portions of the body and to said cutting element for accommodating heating means in said passage means to maintain said knife-edge in a heated condition while solid material is being severed by the knife assembly.

6. A knife assembly as defined in claim 5 in which a thin barrier layer of heat-insulating material covers the inner surfaces of said supporting body in said slot thereof to resist the transmission of heat from said mounting element through said surfaces to said body including said front and back shielding wall portions thereof and to promote the temporary storing of heat by said mounting element; and in which said cutting element is of gradually tapered formation in cross-section to provide said sharp knife-edge.

7. A knife assembly as defined in claim 5 in which a thin barrier layer of heat-insulating material is disposed between adjacent opposed surfaces of said mounting element and said supporting body including said front and back shielding wall portions thereof to resist the transmission of heat from said mounting element to said body; and in which said mounting element has a groove of substantial depth extending along and laterally inwardly in said side face thereof; and in which said cutting element has an extension in said groove in the mounting element in supported contacting heat-transmitting relation to the inner surfaces of said mounting element in said groove.

8. A knife assembly as defined in claim 5 in which said supporting body and said cutting element and said mounting element are each of thermally conductive metal material, the metal material of said cutting element having a thermal conductivity about nine times that of the supporting body but about two times that of the mounting element for facilitating the rapid transmission of heat through said mounting element to said cutting element while minimizing the transmission of heat from said mounting element to said supporting body; and in which said mounting element has electrical resistance heating units mounted entirely and detachably in said passage means.

9. A knife assembly for severing solid material, said knife assembly comprising a supporting body of knife-like formation and stiff material resistant to distortion under heat and having a side margin extending along the body, a cutting element of stiff heat-conductive material extending along said side margin in outwardly spaced relation thereto laterally of the body and presenting a sharp knife-edge remote from said body, a mounting element of stiff material of lower heat-conductivity than that of said cutting element but higher heat-conductivity than that of said supporting body extending from said side margin of the body to said cutting element, said mounting element having passage means extending therein along both said body and said cutting element in spaced relation thereto for accommodating electrical heating means in said passage means to maintain said knife-edge in a heated condition while solid material is being severed by the knife assembly, means detachably securing said mounting element to said supporting body at said side margin thereof in backingly supported relation thereto, and means detachably securing said cutting element to said mounting element in backingly supported contacting heat-conducting relation thereto.

References Cited in the file of this patent

UNITED STATES PATENTS

| | | |
|---|---|---|
| 2,032,688 | Dart | Mar. 3, 1936 |
| 2,107,220 | Schulz | Feb. 1, 1938 |
| 2,206,994 | Zent | July 9, 1940 |

FOREIGN PATENTS

| | | |
|---|---|---|
| 701,935 | France | Jan. 13, 1931 |